United States Patent
Holm

(10) Patent No.: US 6,290,738 B1
(45) Date of Patent: Sep. 18, 2001

(54) INERTIAL GAS-LIQUID SEPARATOR HAVING AN INERTIAL COLLECTOR SPACED FROM A NOZZLE STRUCTURE

(75) Inventor: Christopher E. Holm, Madison, WI (US)

(73) Assignee: Nelson Industries, Inc., Stoughton, WI (US)

( * ) Notice: Subject to any disclaimer, the term of this patent is extended or adjusted under 35 U.S.C. 154(b) by 0 days.

(21) Appl. No.: 09/356,072

(22) Filed: Jul. 16, 1999

(51) Int. Cl.[7] .................. B01D 45/08; B01D 50/00
(52) U.S. Cl. .................. 55/309; 55/329; 55/465; 55/466; 55/DIG. 14; 96/190
(58) Field of Search .................. 55/309, 320, 329, 55/332, 462, 464, 465, 466, 482, DIG. 14; 96/188, 189, 190

(56) References Cited

U.S. PATENT DOCUMENTS

| | | |
|---|---|---|
| Re. 35,433 | 1/1997 | Alexander, III . |
| 756,943 * | 1/1904 | Duck ........................... 55/464 |
| 3,433,231 * | 3/1969 | Siragusa ...................... 55/465 |
| 3,803,810 | 4/1974 | Rosenberg . |
| 3,923,480 * | 12/1975 | Visch .......................... 55/465 |
| 4,012,209 * | 3/1977 | McDowell et al. .......... 55/465 |
| 4,076,507 | 2/1978 | Hauberg . |
| 4,092,846 | 6/1978 | Jeffery et al. . |
| 4,273,562 | 6/1981 | Niskanen . |
| 4,409,950 | 10/1983 | Goldberg . |
| 4,478,619 | 10/1984 | Arends et al. . |
| 4,627,406 | 12/1986 | Namiki et al. . |
| 4,676,807 | 6/1987 | Miller et al. . |
| 4,759,782 | 7/1988 | Miller et al. . |
| 4,923,491 | 5/1990 | Lawless et al. . |
| 5,053,126 | 10/1991 | Krasnoff . |
| 5,061,300 | 10/1991 | Alexander, III . |
| 5,201,301 | 4/1993 | Re . |
| 5,203,891 | 4/1993 | Lema . |
| 5,243,950 | 9/1993 | Dalupan . |
| 5,487,371 | 1/1996 | Beckman et al. . |
| 5,562,087 | 10/1996 | Wright . |
| 5,622,621 | 4/1997 | Kramer . |
| 5,693,125 | 12/1997 | Dean . |
| 5,800,597 | 9/1998 | Perrotta et al. . |
| 5,807,427 | 9/1998 | Welch . |
| 5,833,847 | 11/1998 | Adriaenssen . |
| 5,863,317 | 1/1999 | Smith et al. . |

FOREIGN PATENT DOCUMENTS

| | | | |
|---|---|---|---|
| 8434233 | 3/1991 | (DE) . | |
| 0132174 | 1/1985 | (EP) . | |
| 1109693 | 4/1968 | (GB) . | |
| 62-57625 * | 3/1987 | (JP) ........................ 55/465 |
| 63-31527 * | 2/1988 | (JP) ........................ 55/465 |
| 1806824 * | 4/1993 | (RU) ........................ 55/465 |

\* cited by examiner

*Primary Examiner*—Duane Smith
*Assistant Examiner*—Robert A. Hopkins

(57) ABSTRACT

An inertial gas-liquid separator includes a housing having an inlet for receiving a gas-liquid stream, and an outlet for discharging a gas stream. Nozzle structure in the housing has a plurality of nozzles receiving the gas-liquid stream from the inlet and accelerating the gas-liquid stream through the nozzles. An inertial collector in the housing in the path of the accelerated gas-liquid stream causes a sharp directional change thereof and in preferred form has a rough porous collection surface causing liquid particle separation from the gas-liquid stream of smaller size liquid particles than a smooth non-porous impactor impingement surface and without the sharp cut-off size of the latter, to improve over all separation efficiency including for smaller liquid particles. Various housing configurations and geometries are provided.

26 Claims, 3 Drawing Sheets

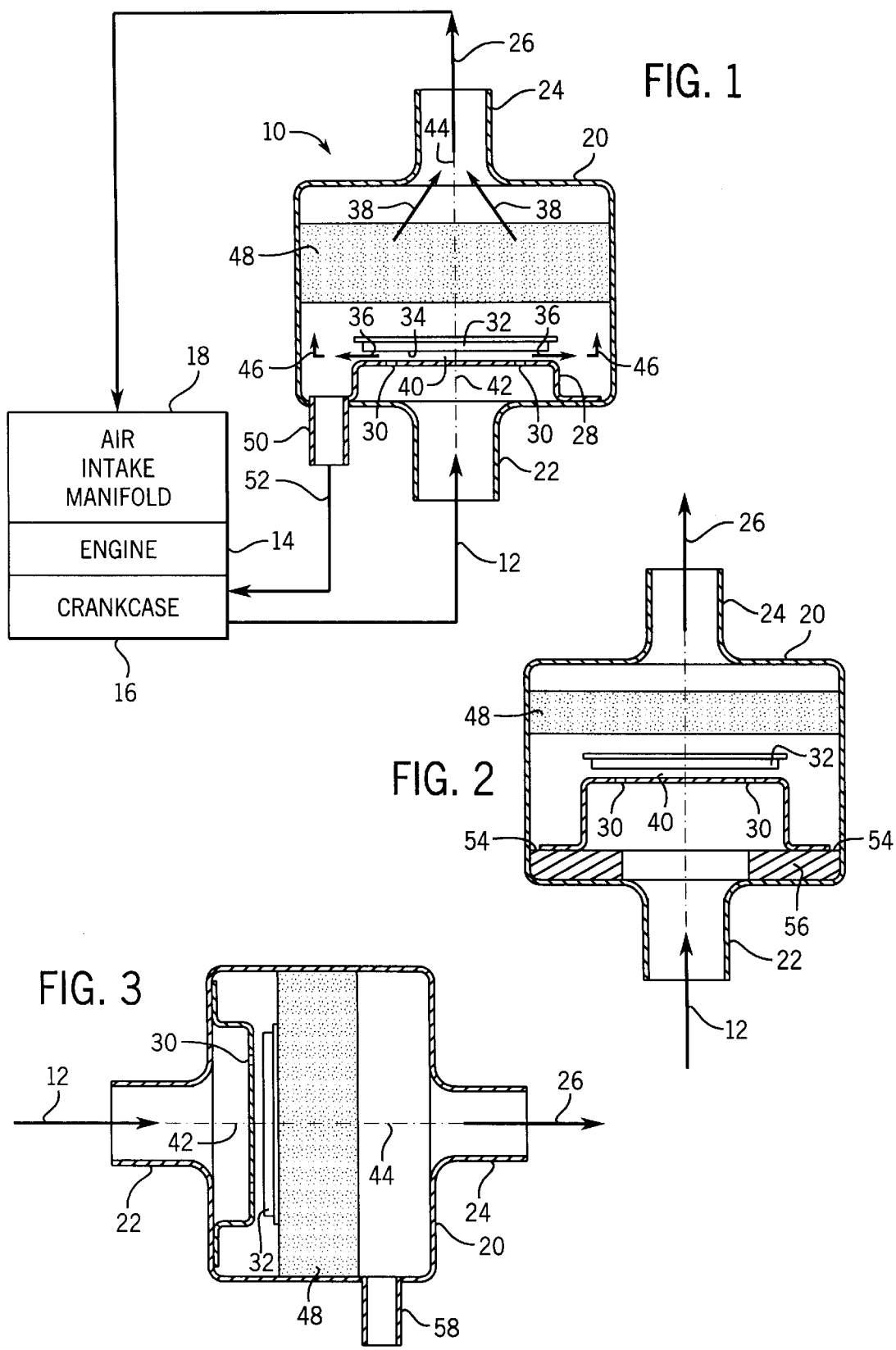

INERTIAL GAS-LIQUID SEPARATOR HAVING AN INERTIAL COLLECTOR SPACED FROM A NOZZLE STRUCTURE

BACKGROUND AND SUMMARY

The invention relates to inertial gas-liquid separators for removing and coalescing liquid particles from a gas-liquid stream, including in engine crankcase ventilation separation applications.

Inertial gas-liquid separators are known in the prior art. Liquid particles are removed from a gas-liquid stream by accelerating the stream or aerosol to high velocities through holes or nozzles and directing same against an impactor having a smooth impervious impingement surface causing the accelerated gas-liquid stream to follow a sharp directional change, effecting the noted liquid separation. These types of inertial impactors are typically used as measurement devices to classify and determine concentration and size distribution of aerosol particles. In particle size measurement devices, the smooth impervious impingement surface provides a sharp cut-off size such that particles above the cut-off size are separated, and those below the cut-off size continue in the stream. Such inertial impactors have also been used in oil separation applications for blow-by gases from the crankcase of an internal combustion engine.

The present invention provides an inertial gas-liquid separator with improved overall separation efficiency, including for liquid particles smaller than the cut-off size of a smooth non-porous impactor impingement surface. In one aspect of the invention, a rough porous collection surface is used for impingement, causing liquid particle separation from the gas-liquid stream of smaller size liquid particles than a smooth non-porous impactor impingement surface and without the sharp cut-off size of the latter. Overall separation efficiency is improved because of the additional separation of liquid particles smaller than the cut-off size of a smooth non-porous impactor impingement surface.

In another aspect of the invention, an inertial gas-liquid separator is provided with a rough porous collection surface causing both liquid particle separation from the gas-liquid stream and collection of liquid particles within the collection surface. The rough porous collection surface has a cut-off size for particle separation which is not as sharp as that of a smooth non-porous impactor impingement surface but improves collection efficiency for particles smaller than the cut-off size as well as a reduction in cut-off size. The rough porous collection surface provides a coalescing medium such that liquid particles, once captured within the collection surface, will coalesce with other liquid particles in the collection surface, and such that the accelerated gas stream and resultant high velocity of gas at and within the collection surface creates drag forces sufficient to cause captured liquid to migrate to outer edges of the collection surface and shed off of the collector.

In further aspects of the invention, various structural housing combinations and geometries are provided, and are particularly well suited to engine crankcase ventilation separation applications, though other applications are possible.

BRIEF DESCRIPTION OF THE DRAWINGS

FIG. 1 is a schematic side sectional view of an inertial gas-liquid separator constructed in accordance with the invention, in an engine crankcase ventilation separation application.

FIG. 2 is like FIG. 1 and shows another embodiment.

FIG. 3 is like FIG. 1 and shows another embodiment.

DETAILED DESCRIPTION

Figure 4:
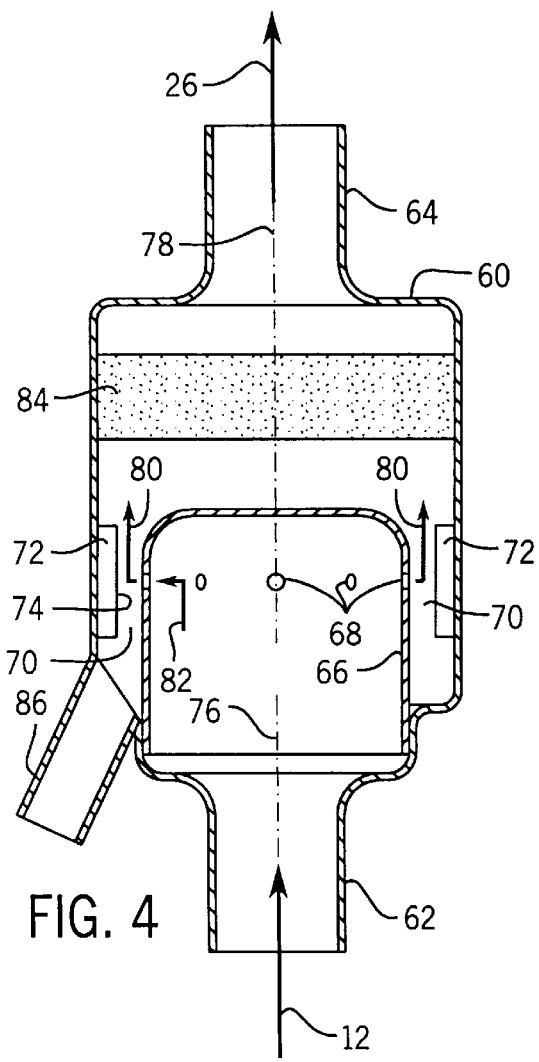
FIG. 4 is like FIG. 1 and shows another embodiment.

FIG. 1 shows an inertial gas-liquid separator 10 for removing and coalescing liquid particles from a gas-liquid stream 12, and shown in an exemplary crankcase ventilation separation application for an internal combustion engine 14. In such application, it is desired to vent combustion blow-by gases from crankcase 16 of engine 14. Untreated, these gases contain particulate matter in the form of oil mist and sool. It is desirable to control the concentration of the contaminants, especially if the blow-by gases are to be recirculated back into the engine's air intake system, for example at air intake manifold 18. The oil mist droplets are generally less than 5 microns in diameter, and hence are difficult to remove using conventional fibrous filter media while at the same time maintaining low flow resistance as the media collects and becomes saturated with oil and contaminants.

Separator 10 includes a housing 20 having an inlet 22 for receiving gas-liquid stream 12 from engine crankcase 16, and an outlet 24 for discharging a gas stream 26 to air intake manifold 18. Nozzle structure 28 in the housing has a plurality of nozzles or holes 30 receiving the gas-liquid stream from inlet 22 and accelerating the gas-liquid stream through nozzles 30. An inertial collector 32 in the housing is in the path of the accelerated gas-liquid stream and causes a sharp directional change thereof as shown at 36. Collector 32 has a rough porous collection or impingement surface 34 causing liquid particle separation from the gas-liquid stream of smaller size liquid particles than a smooth non-porous impactor impingement surface and without the sharp cut-off size of the latter. The use of a rough porous collection surface is contrary to typical inertial gas-liquid separators, but is intentional in the present invention, for the above noted reasons, and as further noted herein.

The noted rough porous collection surface improves overall separation efficiency including for liquid particles smaller than the cut-off size of a smooth non-porous impactor impingement surface. The rough porous collection surface causes both: a) liquid particle separation from the gas-liquid stream; and b) collection of the liquid particles within the collection surface. The rough porous collection surface has a cut-off size for particle separation which is not as sharp as that of a smooth non-porous impactor impingement surface but improves collection efficiency for particles smaller than the cut-off size as well as a reduction in cut-off size. The rough porous collection surface provides a coalescing medium, such that liquid particles, once captured within the collection surface, will coalesce with other liquid particles in the collection surface, and such that the accelerated gas stream and resultant high velocity of gas at and within the collection surface creates drag forces sufficient to cause captured liquid to migrate to outer edges of the collection surface and shed off of the collector. After the noted sharp directional change, outlet 24 receives the gas stream, as shown at 38, absent the separated liquid particles. Collection surface 34 and nozzles 30 are separated by a gap 40 sufficient to avoid excessive restriction. Housing 20 has a flow path therethrough including a first flow path portion 42 for the gas-liquid stream between inlet 22 and gap 40, and a second flow path portion 44 for the gas stream between gap 40 and outlet 24. The flow path through housing 20 has a directional change in gap 40 at collection surface 34, and another directional change in the noted second flow path portion, as shown at 46.

A pass-through filter 48, FIG. 1, in the noted second flow path portion provides a back-up safety filter trapping liquid particles re-entrained in the gas stream after separation at inertial collector 32. Drain 50 in the housing drains separated fluid from the collector. In FIG. 1, drain 50 drains the separated fluid externally of housing 20 as shown at 52 back to crankcase 16. Drain 50 is gravitationally below and on the opposite side of collector 32 from pass-through filter 48. In FIG. 1, gas stream 26 flows along a vertical axial direction. Filter 48 extends along a radial left-right horizontal span perpendicular to the noted axial vertical direction. The noted radial horizontal span of pass-through filter 48 extends across the entire housing and is parallel to collection surface 34. The gas stream flows radially at 36 along and parallel to collection surface 34 after separation and then turns 90° as shown at 46 and flows through pass-throuah filter 48 to outlet 24 as shown at 38.

FIG. 2 is similar to FIG. 1 and uses like reference numerals where appropriate to facilitate understanding. In FIG. 2, drain 54 drains separated fluid back to inlet 22. A second pass-through filter 56 in the housing is gravitationally below and on the opposite side of collector 32 from pass-through filter 48 and filters separated liquid from collector 32. Drain 54 drains filtered fluid through pass-through filter 56 to inlet 22.

Drain 54 in FIG. 2 is also a bypass port through which gas-liquid stream 12 may flow to gap 40 without being accelerated through nozzles 30. The gas-liquid stream from inlet 22 thus has a main flow path through nozzles 30 and accelerated through gap 40 against collector 32, and an alternate flow path through filter 56 and bypass port 54 to gap 40. Pass-through filter 56 in the noted alternate flow path traps and coalesces liquid in the gas-liquid stream from inlet 22 to remove liquid from the gas stream supplied to outlet 24 through the noted alternate flow path. Outlet 24 thus receives a gas stream from the noted main flow path with liquid removed by collector 32, and also receives a gas stream from the noted alternate flow path with liquid removed by pass-through filter 56. Inlet 22 is gravitationally below pass-through filter 56. Liquid removed by pass-through filter 56 from the gas-liquid stream in the noted alternate flow path thus drains to inlet 22. Pass-through filter 56 also filters liquid removed from the gas-liquid stream in the noted main flow path by collector 32 and drains such liquid through drain 54 and filter 56 back to inlet 22.

FIG. 3 uses like reference numerals from above where appropriate to facilitate understanding. In FIG. 3, the axial flow of the gas stream through the housing is horizontal. Drain 58 in the housing drains separated fluid from the collector externally of the housing back to crankcase 16. Drain 58 is in the noted second flow path portion 44 and drains separated fluid from collector 32 through pass-through filter 48 such that the latter filters both gas stream 26 and the separated fluid. Drain 58 is between pass-through filter 48 and outlet 24, and is gravitationally below collector 32 and outlet 24 and pass-through filter 48.

FIG. 4 uses like reference numbers from above where appropriate to facilitate understanding. FIG. 4 shows a vertical orientation of gas flow axially through a housing 60 having an inlet 62 for receiving gas-liquid stream 12, and an outlet 64 for discharging gas stream 26. Nozzle structure 66 in the housing has a plurality of nozzles or holes 68 receiving the gas-liquid stream from inlet 62 and accelerating the gas-liquid stream radially horizontally through nozzles 68 and radially through annular gap 70 to impinge annular inertial collector 72. Collector 72 is in the path of the accelerated gas-liquid stream and causes a sharp directional change thereof and has a rough porous collection surface 74, as above. The housing has a vertical axial flow path therethrough including a first flow path portion 76 for the gas-liquid stream between inlet 62 and gap 70, and a second flow path portion 78 for the gas stream between gap 70 and outlet 64. The flow path has a directional change 80 in gap 70 at collection surface 74, and a directional change 82 in flow path portion 76. Each of directional changes 82 and 80 is 90°. Pass-through filter 84 in flow path portion 78 in the housing provides a back-up safety filter trapping liquid particles re-entrained in the gas stream after separation at inertial collector 72. Filter 84 extends horizontally along a radial span relative to the noted vertical axial direction. The radial horizontal span of filter 84 extends across the entire housing and is perpendicular to collection surface 74. After the noted directional change 80, the gas stream flows axially along and parallel to collection surface 74 and then flows axially through pass-through filter 84 to outlet 64. Drain 86 in housing 60 drains separated fluid from collector 72 externally of the housing back to engine crankcase 16. Drain 86 is gravitationally below and on the opposite side collector 72 from pass-through filter 84.

Figure 5:
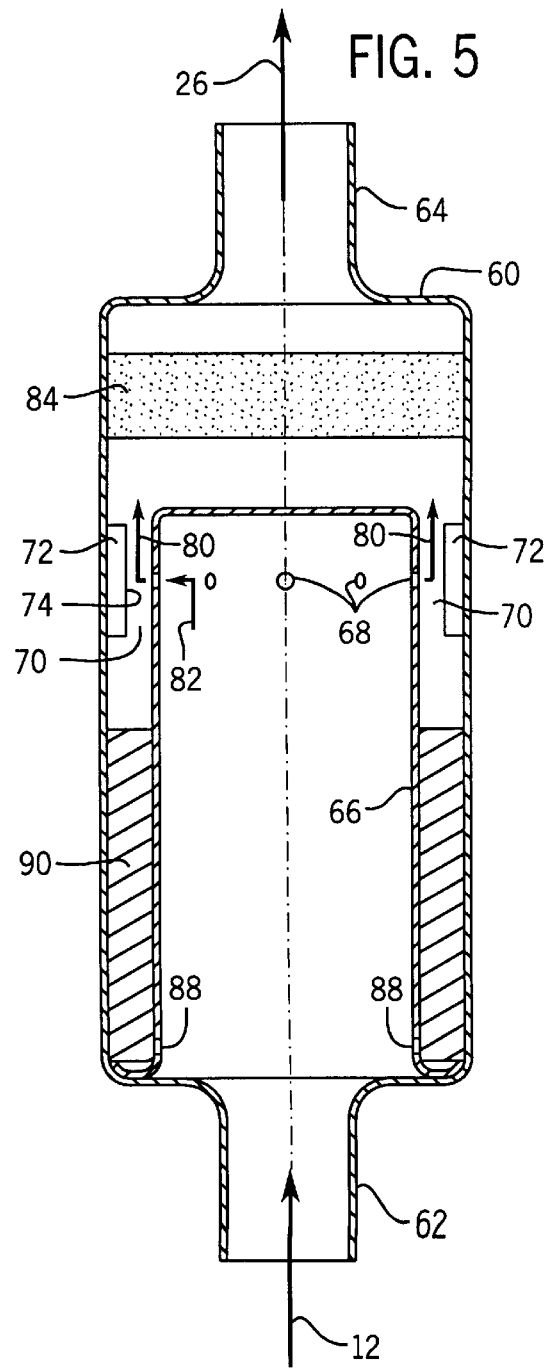
FIG. 5 is like FIG. 1 and shows another embodiment.

FIG. 5 is similar to FIG. 4 and uses like reference numerals where appropriate to facilitate understanding. In FIG. 5, drain 88 in the housing drains separated fluid from collector 72 to inlet 62. Drain 88 is gravitationally below and on the opposite side of collector 72 from pass-through filter 84. A second pass-through filter 90 in the housing is gravitationally below and on the opposite side of collector 72 from pass-through filter 84 and filters separated fluid from collector 72 drained through drain 88 to inlet 62. The drain is provided by a plurality of holes or ports 88 in nozzle structure 66.

Ports 88 in FIG. 5 are also bypass ports through which gas-liquid stream 12 may flow to gap 70 without being accelerated through nozzles 68. The gas-liquid stream from inlet 62 thus has a main flow path through nozzles 68 and accelerated through gap 70 against collector 72, and an alternate flow path through bypass ports 88 and filter 90 to gap 70. Pass-through filter 90 in the noted alternate flow path traps and coalesces liquid in the gas-liquid stream to remove liquid from the gas stream supplied to outlet 64. Outlet 64 thus receives a gas stream from the noted main flow path with liquid removed by collector 72, and receives a gas stream from the noted alternate flow path with liquid removed by pass-through filter 90. Inlet 62 is gravitationally below pass-through filter 90. Liquid removed by pass-through filter 90 from the gas-liquid stream in the noted alternate flow path thus drains through drain or bypass ports 88 to inlet 62. Pass-through filter 90 also filters liquid removed from the gas-liquid stream in the noted main flow path by collector 72 and drains such liquid back through drain 88 to inlet 62.

Figure 6:
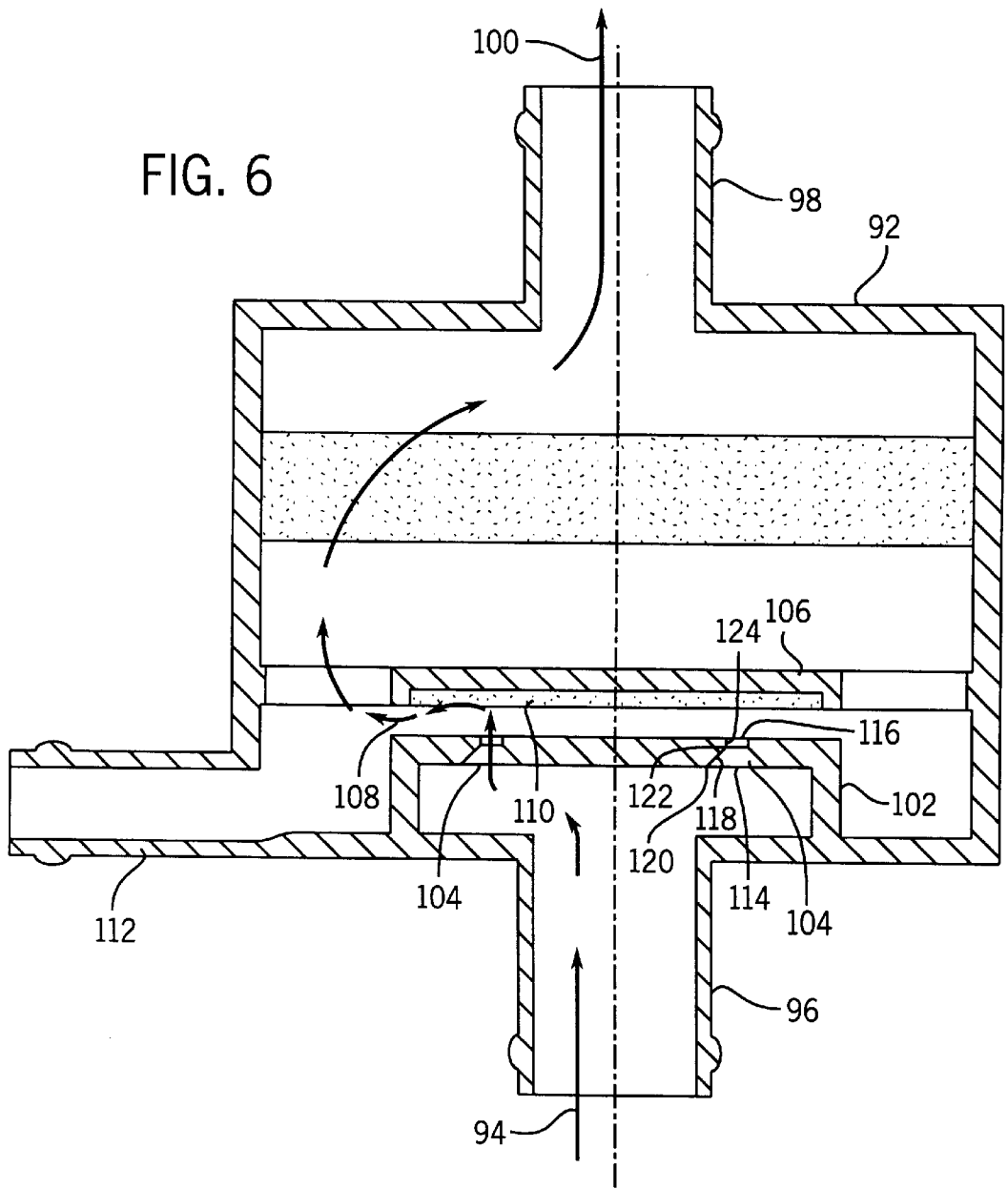
FIG. 6 shows a further embodiment.

FIG. 6 shows an inertial gas-liquid separator 92 for removing and coalescing liquid particles from a gas-liquid stream 94. Housing 92 has an inlet 96 for receiving gas-liquid stream 94, and an outlet 98 for discharging a gas stream 100. Nozzle structure 102 in the housing has a plurality of nozzles 104 receiving the gas-liquid stream from inlet 96 and accelerating the gas-liquid stream through the nozzles. An inertial collector 106 in the housing in the path of the accelerated gas-liquid stream causes a sharp directional change thereof as shown at 108. The collector has a rough porous collection surface 110 causing liquid particle separation from the gas-liquid stream. Drain 112 in the housing drains separated fluid from the collector back to crankcase 16.

Nozzles 104 in FIG. 6 have an upstream entrance opening 114, and a downstream exit opening 116. Entrance opening 114 is larger than exit opening 116. The nozzles have a frusto-conical tapered transition section 118 between the entrance and exit openings. The frusto-conical tapered transition section has an upstream end 120 of a first diameter at entrance opening 114, and has a downstream end 122 of a second diameter smaller than the noted first diameter. Downstream end 122 of frusto-conical tapered transition section 118 is spaced from exit opening 116 by a second transition section 124 of constant diameter equal to the noted second diameter.

In one embodiment, collection surface 34, FIGS. 1–3, 74, FIGS. 4 and 5, 110, FIG. 6, is a fibrous collection surface comprising a plurality of layers of fibers. At least two or three layers of fibers are desirable and provide improved performance. In the preferred embodiment, at least one hundred layers of fibers are provided. The fibers have a diameter at least three times the diameter of the liquid particles to be separated and captured. In preferred form, the fiber diameter is in the range of 50 to 500 microns. For oil mist droplets in the range from 0.3 microns to 3 microns, with a 1.7 micron average, particle separation efficiency improved to 85% mass efficiency with the noted fibrous collection surface, as comparing to 50% mass efficiency for a smooth non-porous collection surface.

In another embodiment, the collection surface is a porous collection surface of porosity between 50% and 99.9%. The average pore size is at least five to ten times the diameter of the liquid particles, and preferably at least 25 to 50 microns.

In another embodiment, the collection surface is a rough collection surface having a roughness measured in peak-to-valley height of at least ten times the diameter of the liquid particles. The peak to valley height is measured parallel to the direction of gas-liquid flow from the nozzles to the collection surface. The peak-to-valley height is preferably at least 10 microns.

It is recognized that various equivalents, alternatives and modifications are possible within the scope of the appended claims.

What is claimed is:

1. An inertial gas-liquid separator for removing and coalescing liquid particles from a gas-liquid stream, comprising a housing having an inlet for receiving a gas-liquid stream, and an outlet for discharging a gas stream, nozzle structure in said housing having a plurality of nozzles receiving said gas-liquid stream from said inlet and accelerating said gas-liquid stream through said nozzles, an inertial collector in said housing in the path of said accelerated gas-liquid stream and causing a sharp directional change thereof and having a rough porous collection surface causing liquid particle separation from said gas-liquid stream of smaller size liquid particles than a smooth non-porous impactor impingement surface and without the sharp cut-off size of the latter, to improve overall separation efficiency including for liquid particles smaller than the cut-off size of a smooth non-porous impactor impingement surface, said outlet receiving said gas stream after said sharp directional change, wherein said collection surface and said nozzles are spaced by a gap sufficient to avoid excessive restriction, said housing has a flow path therethrough including a first flow path portion for said gas-liquid stream between said inlet and said gap through said nozzles, and a second flow path portion for said gas stream between said gap and said outlet, said flow path having a first directional change in said gap at said collection surface, and a second directional change in one of said first and second flow path portions, and said second directional change is in said first flow path portion.

2. The invention according to claim 1 wherein said second directional change is 90°.

3. An inertial gas-liquid separator for removing and coalescing liquid particles from a gas-liquid stream, comprising a housing having an inlet for receiving a gas-liquid stream, and an outlet for discharging a gas stream, nozzle structure in said housing having a plurality of nozzles receiving said gas-liquid stream from said inlet and accelerating said gas-liquid stream through said nozzles, an inertial collector in said housing in the path of said accelerated gas-liquid stream and causing a sharp directional change thereof and having a rough porous collection surface causing liquid particle separation from said gas-liquid stream of smaller size liquid particles than a smooth non-porous impactor impingement surface and without the sharp cut-off size of the latter, to improve overall separation efficiency including for liquid particles smaller than the cut-off size of a smooth non-porous impactor impingement surface, said outlet receiving said gas stream after said sharp directional change, wherein said collection surface and said nozzles are spaced by a gap sufficient to avoid excessive restriction, said housing has a flow path therethrough including a first flow path portion for said gas-liquid stream between said inlet and said gap through said nozzles, and a second flow path portion for said gas stream between said gap and said outlet, said flow path having a first directional change in said gap at said collection surface, and a second directional change in one of said first and second flow path portions, and comprising a pass-through filter in said second flow path portion providing a back-up safety filter trapping liquid particles re-entrained in said gas stream after said separation at said inertial collector, a drain in said housing draining separated fluid from said collector, and wherein said drain is in said second flow path portion and drains said separated fluid from said collector through said pass-through filter such that the latter filters both said gas stream and said separated fluid.

4. The invention according to claim 3 wherein said drain is between said pass-through filter and said outlet, and is gravitationally below said collector and said outlet and said pass-through filter.

5. An inertial gas-liquid separator for removing and coalescing liquid particles from a gas-liquid stream, comprising a housing having an inlet for receiving a gas-liquid stream, and an outlet for discharging a gas stream, nozzle structure in said housing having a plurality of nozzles receiving said gas-liquid stream from said inlet and accelerating said gas-liquid stream through said nozzles, an inertial collector in said housing in the path of said accelerated gas-liquid stream and causing a sharp directional change thereof and having a rough porous collection surface causing liquid particle separation from said gas-liquid stream of smaller size liquid particles than a smooth non-porous impactor impingement surface and without the sharp cut-off size of the latter, to improve overall separation efficiency including for liquid particles smaller than the cut-off size of a smooth non-porous impactor impingement surface, said outlet receiving said gas stream after said sharp directional change, wherein said collection surface and said nozzles are spaced by a gap sufficient to avoid excessive restriction, said housing has a flow path therethrough including a first flow path portion for said gas-liquid stream between said inlet and said gap through said nozzles, and a second flow path portion for said gas stream between said gap and said outlet, said flow path having a first directional change in said gap at said collection surface, and a second directional change in one of said first and second flow path portions, and comprising a pass-through filter in said second flow path portion providing a back-up safety filter trapping liquid particles re-entrained in said gas stream after said separation at said inertial collector, and a second pass-through filter in said housing gravitationally below and on the opposite side of said collector from said first mentioned pass-through filter and filtering separated liquid from said collector.

6. The invention according to claim 5 comprising a drain in said housing draining filtered fluid through said second pass-through filter to said inlet.

7. An inertial gas-liquid separator for removing and coalescing liquid particles from a gas-liquid stream, comprising a housing having an inlet for receiving a gas-liquid stream, and an outlet for discharging a gas stream, nozzle structure in said housing having a plurality of nozzles receiving said gas-liquid stream from said inlet and accelerating said gas-liquid stream through said nozzles, an inertial collector in said housing in the path of said accelerated gas-liquid stream and causing a sharp directional change thereof and having a rough porous collection surface causing liquid particle separation from said gas-liquid stream of smaller size liquid particles than a smooth non-porous impactor impingement surface and without the sharp cut-off size of the latter, to improve overall separation efficiency including for liquid particles smaller than the cut-off size of a smooth non-porous impactor impingement surface, said outlet receiving said gas stream after said sharp directional change, wherein said collection surface and said nozzles are spaced by a gap sufficient to avoid excessive restriction, and said nozzle structure has a bypass port through which said gas-liquid stream may flow to said gap without being accelerated through said nozzles, such that said gas-liquid stream from said inlet has a main flow path through said nozzles and accelerated through said gap against said collector, and has an alternate flow path through said bypass port to said gap.

8. The invention according to claim 7 comprising a pass-through filter in said alternate flow path trapping and coalescing liquid in said gas-liquid stream to remove liquid from the gas stream supplied to said outlet, such that said outlet receives a gas stream from said main flow path with liquid removed by said collector, and receives a gas stream from said alternate flow path with liquid being removed by pass-through filter.

9. The invention according to claim 8 wherein said inlet is gravitationally below said pass-through filter, such that liquid removed by said pass-through filter from the gas-liquid stream in said alternate flow path drains to said inlet, and such that said pass-through filter also filters liquid removed from the gas-liquid stream in said main flow path by said collector and drains such liquid back to said inlet.

10. An inertial gas-liquid separator for removing and coalescing liquid particles from a gas-liquid stream, comprising a housing having an inlet for receiving a gas-liquid stream, and an outlet for discharging a gas stream, nozzle structure in said housing having a plurality of nozzles receiving said gas-liquid stream from said inlet and accelerating said gas-liquid stream through said nozzles, an inertial collector in said housing in the path of said accelerated gas-liquid stream and causing a sharp directional change thereof and having a rough porous collection surface causing liquid particle separation from said gas-liquid stream of smaller size liquid particles than a smooth non-porous impactor impingement surface and without the sharp cut-off size of the latter, to improve overall separation efficiency including for liquid particles smaller than the cut-off size of a smooth non-porous impactor impingement surface, said outlet receiving said gas stream after said sharp directional change, wherein said collection surface comprises a fibrous collection surface comprising a plurality of layers of fibers, and comprising at least one hundred said layers.

11. An inertial gas-liquid separator for removing and coalescing liquid particles from a gas-liquid stream, comprising a housing having an inlet for receiving a gas-liquid stream, and an outlet for discharging a gas stream, nozzle structure in said housing having a plurality of nozzles receiving said gas-liquid stream from said inlet and accelerating said gas-liquid stream through said nozzles, an inertial collector in said housing in the path of said accelerated gas-liquid stream and causing a sharp directional change thereof and having a rough porous collection surface causing liquid particle separation from said gas-liquid stream of smaller size liquid particles than a smooth non-porous impactor impingement surface and without the sharp cut-off size of the latter, to improve overall separation efficiency including for liquid particles smaller than the cut-off size of a smooth non-porous impactor impingement surface, said outlet receiving said gas stream after said sharp directional change wherein said collection surface comprises a fibrous collection surface comprising a plurality of layers of fibers, and said fibers have a diameter at least three times the diameter of said liquid particles.

12. The invention according to claim 11 wherein said fiber diameter is in the range of at least 50 to 500 microns.

13. An inertial gas-liquid separator for removing and coalescing liquid particles from a gas-liquid stream comprising a housing having an inlet for receiving a gas-liquid stream, and an outlet for discharging a gas stream, nozzle structure in said housing having a plurality of nozzles receiving said gas-liquid stream from said inlet and accelerating said gas-liquid stream through said nozzles, an inertial collector in said housing in the path of said accelerated gas-liquid stream and causing a sharp directional change thereof and having a rough porous collection surface causing liquid particle separation from said gas-liquid stream of smaller size liquid particles than a smooth non-porous impactor impingement surface and without the sharp cut-off size of the latter, to improve overall separation efficiency including for liquid particles smaller than the cut-off size of a smooth non-porous impactor impingement surface, said outlet receiving said gas stream after said sharp directional change, wherein said collection surface comprises a porous collection surface having an average pore size at least five times the diameter of said liquid particles.

14. The invention according to claim 13 wherein said pore size is at least 25 microns.

15. The invention according to claim 13 wherein said average pore size is at least ten times the diameter of said liquid particles.

16. The invention according to claim 15 wherein said pore size is at least 50 microns.

17. An inertial gas-liquid separator for removing and coalescing liquid particles from a gas-liquid stream, comprising a housing having an inlet for receiving a gas-liquid stream, and an outlet for discharging a gas stream, nozzle structure in said housing having a plurality of nozzles receiving said gas-liquid stream from said inlet and accelerating said gas-liquid stream through said nozzles, an inertial collector in said housing in the path of said accelerated gas-liquid stream and causing a sharp directional change thereof and having a rough porous collection surface causing liquid particle separation from said gas-liquid stream of smaller size liquid particles than a smooth non-porous impactor impingement surface and without the sharp cut-off size of the latter, to improve overall separation efficiency including for liquid particles smaller than the cut-off size of a smooth non-porous impactor impingement surface, said outlet receiving said gas stream after said sharp directional change, wherein said collection surface comprises a rough collection surface having a roughness measured in peak-to-valley height of at least ten times the diameter of said liquid particles.

18. The invention according to claim 17 wherein said peak-to-valley height is measured parallel to the direction of gas-liquid flow from said nozzles to said collection surface.

19. The invention according to claim 18 wherein said peak-to-valley height is at least 10 microns.

20. An inertial gas-liquid separator for removing and coalescing liquid particles from a gas-liquid stream comprising a housing having an inlet for receiving a gas-liquid stream, and an outlet for discharging a gas stream, nozzle structure in said housing having a plurality of nozzles receiving said gas-liquid stream from said inlet and accelerating said gas-liquid stream through said nozzles, an inertial collector in said housing in the path of said accelerated gas-liquid stream and causing a sharp directional change thereof and having a collection surface causing liquid particle separation from said gas-liquid stream, said collection surface and said nozzles being separated by a gap sufficient to avoid excessive restriction, said housing having a flow path therethrough including a first flow path portion for said gas-liquid stream between said inlet and said gap, and a second flow path portion for said gas stream between said gap and said outlet, a pass-through filter in said second flow path portion providing a back-up safety filter trapping liquid particles re-entrained in said gas stream after said separation at said inertial collector, a second pass-through filter in said housing gravitationally below and on the opposite side of said collector from said first mentioned pass-through filter and filtering separated liquid from said collector.

21. The invention according to claim 20 comprising a drain in said housing draining filtered fluid through said second pass-through filter to said inlet.

22. An inertial gas-liquid separator for removing and coalescing liquid particles from a gas-liquid stream comprising a housing having an inlet for receiving a gas-liquid stream, and an outlet for discharging a gas stream, nozzle structure in said housing having a plurality of nozzles receiving said gas-liquid stream from said inlet and accelerating said gas-liquid stream through said nozzles, an inertial collector in said housing in the path of said accelerated gas-liquid stream and causing a sharp directional change thereof and having a collection surface causing liquid particle separation from said gas-liquid stream, said collection surface and said nozzles being separated by a gap sufficient to avoid excessive restriction, said housing having a flow path therethrough including a first flow path portion for said gas-liquid stream between said inlet and said gap, and a second flow path portion for said gas stream between said gap and said outlet, a pass-through filter in said second flow path portion providing a back-up safety filter trapping liquid particles re-entrained in said gas stream after said separation at said inertial collector, a drain in said housing draining separated fluid from said collector, said drain being in said second flow path portion and draining said separated fluid from said collector through said pass-through filter such that the latter filters both said gas stream and said separated fluid.

23. The invention according to claim 22 wherein said drain is between said pass-through filer and said outlet, and is gravitationally below said collector and said outlet and said pass-through filter.

24. An inertial gas-liquid separator for removing and coalescing liquid particles from a gas-liquid stream, comprising:

a housing having an inlet for receiving a gas-liquid stream, and an outlet for discharging a gas stream;

nozzle structure in said housing having a plurality of nozzles receiving said gas-liquid stream from said inlet and accelerating said gas-liquid stream through said nozzles;

an inertial collector in said housing in the path of said accelerated gas-liquid stream and causing a sharp directional change thereof and having a collection surface causing liquid particle separation from said gas-liquid stream;

a drain in said housing draining separated fluid from said collector to said inlet, wherein said collection surface and said nozzles are spaced by a gap sufficient to avoid excessive restriction, and comprising a bypass port in said housing through which said gas-liquid stream may flow to said gap without being accelerated through said nozzles, such that said gas-liquid stream from said inlet has a main flow path through said nozzles and accelerated through said gap against said collector, and has an alternate flow path through said bypass port to said gap.

25. The invention according to claim 24 comprising a pass-through filter in said alternate flow path trapping and coalescing liquid in said gas-liquid stream to remove liquid from the gas stream supplied to said outlet, such that said outlet receives a gas stream from said main flow path with liquid removed by said collector, and receives a gas stream from said alternate flow path with liquid removed by said pass-through filter.

26. The invention according to claim 25 wherein said inlet is gravitationally below said pass-through filter such that liquid removed by said pass-through filter from the gas-liquid stream in said alternate flow path drains to said inlet, and such that said pass-through filter also filters liquid removed from the gas-liquid stream in said main flow path by said collector and drains such liquid back to said inlet.

* * * * *